United States Patent
Shen et al.

(10) Patent No.: US 12,219,489 B2
(45) Date of Patent: Feb. 4, 2025

(54) METHOD FOR DETERMINING DETECTION POSITION, CONFIGURATION METHOD, TERMINAL AND NETWORK SIDE DEVICE

(71) Applicant: VIVO MOBILE COMMUNICATION CO., LTD., Guangdong (CN)

(72) Inventors: Xiaodong Shen, Guangdong (CN); Kai Wu, Guangdong (CN); Yanliang Sun, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 497 days.

(21) Appl. No.: 17/521,526

(22) Filed: Nov. 8, 2021

(65) Prior Publication Data
US 2022/0070786 A1 Mar. 3, 2022

Related U.S. Application Data

(63) Continuation of application No. PCT/CN2020/089243, filed on May 8, 2020.

(30) Foreign Application Priority Data

May 10, 2019 (CN) .......................... 201910402001.1

(51) Int. Cl.
*G08C 17/00* (2006.01)
*H04L 5/00* (2006.01)
*H04W 52/02* (2009.01)
*H04W 72/20* (2023.01)
*H04W 76/28* (2018.01)

(52) U.S. Cl.
CPC ....... *H04W 52/0235* (2013.01); *H04L 5/0053* (2013.01); *H04W 72/20* (2023.01); *H04W 76/28* (2018.02)

(58) Field of Classification Search
CPC . H04W 52/0235; H04W 76/28; H04W 72/20; H04L 5/0053
USPC .......................................................... 370/311
See application file for complete search history.

(56) References Cited

U.S. PATENT DOCUMENTS

| | | |
|---|---|---|
| 2017/0118708 A1 | 4/2017 | Alon et al. |
| 2018/0368112 A1 | 12/2018 | Sebeni et al. |
| 2019/0090190 A1 | 3/2019 | Liu et al. |
| 2020/0145921 A1* | 5/2020 | Zhang ............... H04W 52/0235 |
| 2020/0229095 A1* | 7/2020 | Shrestha ................. H04W 4/70 |
| 2021/0212153 A1* | 7/2021 | Siomina ................ H04W 76/28 |

FOREIGN PATENT DOCUMENTS

CN 108353358 A 7/2018

OTHER PUBLICATIONS

International Search Report of International Application No. PCT/CN2020/089243 mailed on Jul. 29, 2020.
(Continued)

*Primary Examiner* — Temica M Beamer
(74) *Attorney, Agent, or Firm* — IP & T GROUP LLP

(57) ABSTRACT

A method for determining a detection position includes: determining a first detection position for first indication information. The first detection position is determined based on first configuration information, and the first indication information is used to instruct the terminal to enter a wake-up state or a sleep state.

19 Claims, 6 Drawing Sheets

(56) References Cited

OTHER PUBLICATIONS

Written Opinion of the International Searching Authority of International Application No. PCT/CN2020/089243 mailed on Jul. 29, 2020.
First Office Action of Priority Application No. CN 201910402001.1 mailed on Feb. 23, 2021.
The Second Office Action of Priority Application No. CN 201910402001.1 mailed on Aug. 24, 2021.
Discussion on PDCCH-based power saving signal/channel, 3GPP TSG RAN WG1 #97, R1-1906227, May 13-17, 2019, Reno, USA. Source: NTT Docomo, Inc.
Additional aspects for supporting wakeup signaling, 3GPP TSG-RAN WG2 Meeting #106 R2-1906704, May 13-17, 2019, Reno, USA. Source: Qualcomm Inc.
RAN2 impact of WUS in connected mode, 3GPP TSG-RAN2 Meeting #106 R2-1906610, May 13-17, 2019, Reno, USA. Source: Ericsson.
Impacts of PDCCH-based wake up signalling, 3GPP TSG-RAN WG2 Meeting #106 R2-1905603, May 13-May 17, 2019, Reno, USA. Source: OPPO.
RAN2 Impacts of PDCCH based WUS, 3GPP TSG-RAN WG2 Meeting #106 R2-1905666, May 13-17, 2019, Reno, USA. Source: CATT.

\* cited by examiner

Determining a first detection position of first indication information, wherein the first detection position is determined based on first configuration information, and the first indication information is used to indicate the terminal to enter a wake-up state or a sleep state ⎯ 601
FIG. 6
FIG. 7a
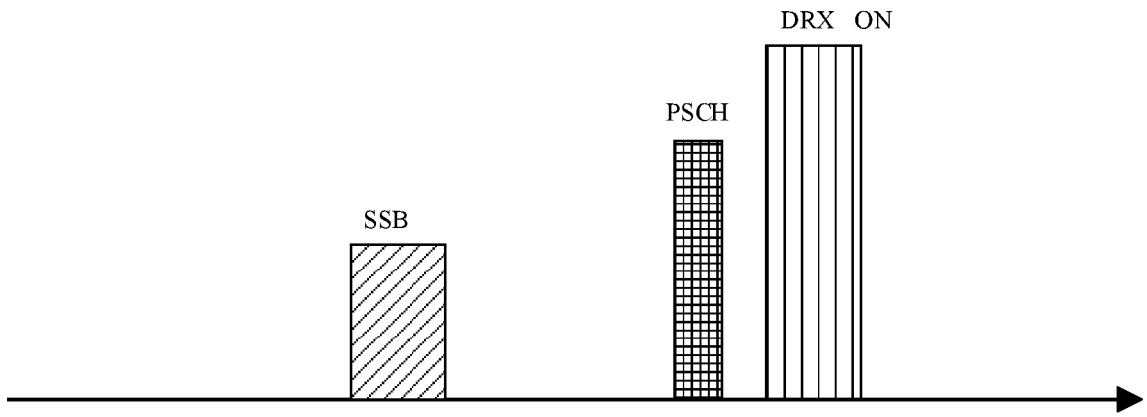
FIG. 7b
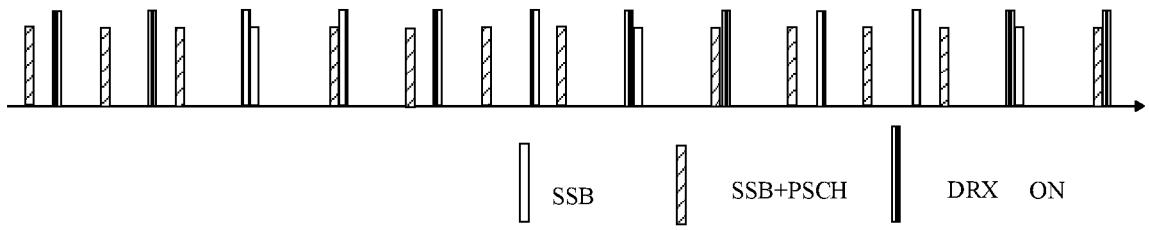
FIG. 8

Transmitting first configuration information, wherein the first configuration information is used for a terminal to determine a first detection position of first indication information, and the first indication information is used to indicate the terminal to enter a wake-up state or a sleep state — 901
FIG. 9
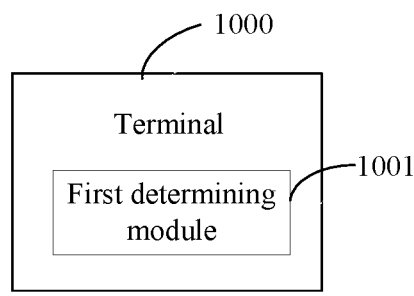
FIG. 10
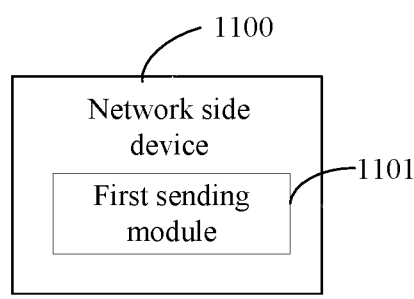
FIG. 11

METHOD FOR DETERMINING DETECTION POSITION, CONFIGURATION METHOD, TERMINAL AND NETWORK SIDE DEVICE

CROSS-REFERENCE TO RELATED APPLICATIONS

This application is a Bypass Continuation Application of PCT/CN2020/089243, filed on May 8, 2020, which claims priority to Chinese Patent Application No. 201910402001.1 filed on May 10, 2019, which are incorporated herein by reference in their entirety.

TECHNICAL FIELD

Embodiments of the present disclosure relate to the technical field of communication, and in particular, to a method for determining a detection position, a configuration method, a terminal, and a network side device.

BACKGROUND

A terminal may learn whether it is necessary to wake up to receive service or sleep within a subsequent period of time (for example, a next discontinuous reception (DRX) cycle) by detecting a physical downlink control channel-based power saving signal/channel (PSCH).

The detection position of the PSCH affects the sleep time of the terminal, thereby affecting energy consumption of the terminal. For example: if the detection position of the PSCH is relatively close to the detection position of the DRX, the terminal will be unable to enter deep sleep after detecting the PSCH, resulting in high energy consumption. Therefore, it is necessary to provide a method for determining a detection position of the PSCH.

SUMMARY

Embodiments of the present disclosure provides a method for determining a detection position, a configuration method, a terminal and a network side device, so as to provide a method for determining a detection position of the PSCH.

According to a first aspect, an embodiment of the present disclosure provides a method for determining a detection position, applied to a terminal. The method includes:
determining a first detection position for first indication information, where the first detection position is determined based on first configuration information, and the first indication information is used to instruct the terminal to enter a wake-up state or a sleep state.

According to a second aspect, an embodiment of the present disclosure further provides a configuration method, applied to a network side device. The method includes:
transmitting first configuration information, where the first configuration information is used for a terminal to determine a first detection position for first indication information, and the first indication information is used to instruct the terminal to enter a wake-up state or a sleep state.

According to a third aspect, an embodiment of the present disclosure further provides a terminal, including:
a first determination module, configured to determine a first detection position for first indication information, wherein the first detection position is determined based on first configuration information, and the first indication information is used to instruct the terminal to enter a wake-up state or a sleep state.

According to a fourth aspect, an embodiment of the present disclosure further provides network side device, including:
a first transmitting module, configured to transmit first configuration information, where the first configuration information is used for a terminal to determine a first detection position for first indication information, and the first indication information is used to instruct the terminal to enter a wake-up state or a sleep state.

According to a fifth aspect, an embodiment of the present disclosure further provides a terminal, including: a memory, a processor, and a program stored in the memory and executable on the processor, where when the program is executed by the processor, the steps of the method for determining the detection position according to the embodiment of the present disclosure are implemented.

According to a sixth aspect, an embodiment of the present disclosure further provides a network side device, including: a memory, a processor, and a program stored in the memory and executable on the processor, where when the program is executed by the processor, the steps of the configuration method according to the embodiment of the present disclosure are implemented.

According to a seventh aspect, an embodiment of the present disclosure further provide a non-transitory computer readable storage medium, storing a computer program, where when the computer program is executed by a processor, the steps of the method for determining the detection position according to the embodiment of the present disclosure are implemented, or when the program is executed by the processor, the steps of the configuration method according to the embodiment of the present disclosure are implemented.

DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

FIG. 6 is a first flowchart of a method for determining a detection position according to an embodiment of the present disclosure;

FIG. 7a is a fifth schematic diagram of a detection position according to an embodiment of the present disclosure;

FIG. 7*b* is a sixth schematic diagram of a detection position according to an embodiment of the present disclosure;

FIG. 8 is a seventh schematic diagram of a detection position according to an embodiment of the present disclosure;

FIG. 9 is a second flowchart of a method for determining a detection position according to an embodiment of the present disclosure;

FIG. 10 is a first structural diagram of a terminal according to an embodiment of the present disclosure;

FIG. 11 is a first structural diagram of a network side device according to an embodiment of the present disclosure;

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Terms "first" and "second" in this application are used to distinguish similar objects, and do not need to be used to describe a specific order or sequence. In addition, terms "include", "have", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in the present application means at least one of the connected objects. For example, A and/or B and/or C represents the following cases: only A exists, only B exists, only C exists, both A and B exist, both B and C exist, both A and C exist, or A, B, and C all exist. Similarly, "at least one of A or B" or "at least one of A and B" used in the specification and claims represents the following cases: only A exists, only B exists, or both A and B exist.

Figure 1:
FIG. 1 is a structural diagram of a network system applicable to an embodiment of the present disclosure.

Referring to FIG. 1, FIG. 1 is a structural diagram of a network system applicable to an embodiment of the present disclosure. As shown in FIG. 1, the network system includes a terminal 11 and a network side device 12. Communication may be performed between the terminal 11 and the network side device 12.

In the embodiments of the present disclosure, the terminal 11 may also be called user equipment (UE). During implementation, the terminal 11 may be a mobile phone, a tablet personal computer, a laptop computer, a personal digital assistant (PDA), a mobile Internet device (MID), a wearable device, a vehicle-mounted device, or the like. The network side device 12 may be a base station, a relay, an access point, or the like.

For ease of understanding, the following describes some content in the embodiments of the present disclosure.

I. Discontinuous Reception (DRX)

There are two types of the DRX: IDLE DRX and ACTIVE DRX.

For the IDLE DRX, as the name implies, it is discontinuous reception when UE is in an IDLE state. When the UE is in the IDLE state, there is no radio resource control (RRC) connection and exclusive resources of users, so IDLE DRX mainly monitors a call channel and a broadcast channel, and the purpose of discontinuous reception can be achieved as long as a fixed cycle is defined. However, if the UE wants to monitor a user data channel, the UE must enter a CONNECTED state from the IDLE state.

For the ACTIVEDRX, that is, the DRX when the UE is in an RRC-CONNECTED state, system resource configuration may be optimized, and more importantly, the power of a mobile phone may be saved without enabling the UE to enter an RRC-IDLE mode. For example, some non-real-time applications, such as web browsing and instant messaging, always exist for a period of time, and it is unnecessary for the UE to constantly monitor downlink data and related processing, then the DRX may be applied to such as situation. In addition, the RRC connection still exists in this state, so the UE needs to switch to a support state very quickly.

Figure 2:
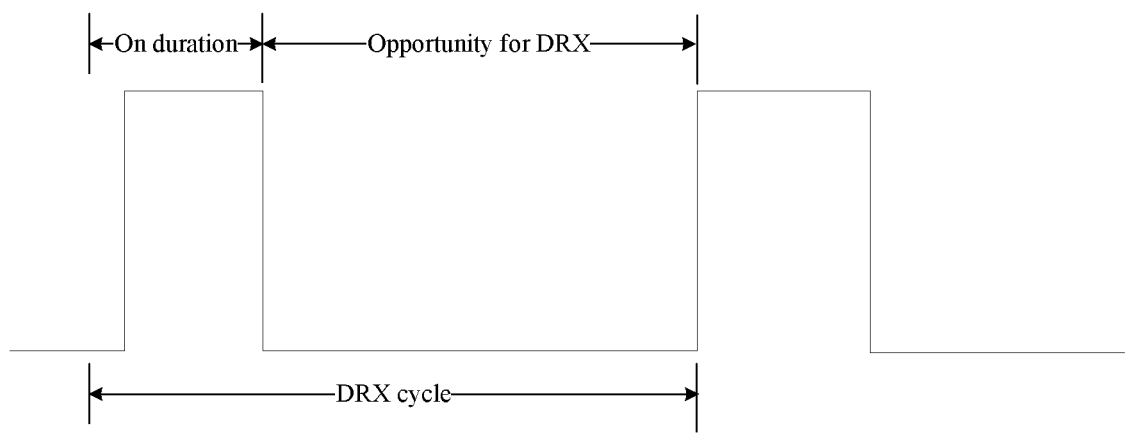
FIG. 2 is a schematic diagram of a DRX cycle according to an embodiment of the present disclosure.

One typical DRX cycle may be referenced to FIG. 2. As shown in FIG. 2, 1 DRX cycle may include an on duration and an opportunity for DRX. The "On Duration" is the time when the UE monitors a physical downlink control channel (PDCCH) subframe (if the network is configured that a terminal monitors the PDCCH in this period), and in this period, the UE is in a wake-up state. The "Opportunity for DRX" is DRX sleep time, namely, the time when the UE enters sleep without monitoring the PDCCH subframe. The longer the time for DRX sleep, the lower the power consumption of the UE, but correspondingly, the delay of service transmission will also increase.

II. PDCCH-Based Power Saving Signal/Channel

The terminal may learn whether it is necessary to wake up to receive service or sleep from the base station within a subsequent period of time (for example, a next DRX cycle) by detecting a PDCCH-based power saving signal/channel (PSCH).

Figure 3:
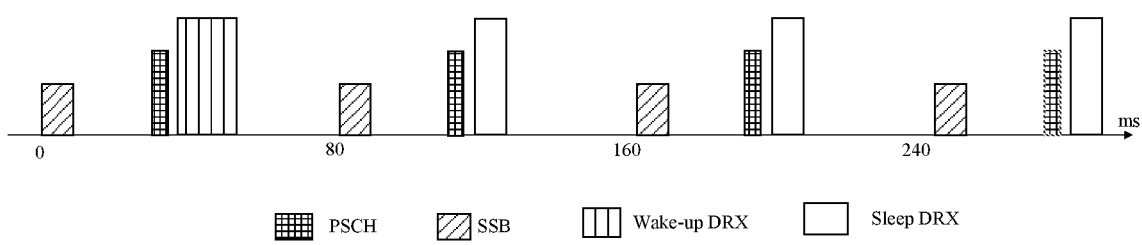
FIG. 3 is a first schematic diagram of a detection position according to an embodiment of the present disclosure.

For convenience of understanding, refer to FIG. 3. In FIG. 3, a synchronization signal and PBCH block (SSB) period on a secondary cell (SCell) (SSB Period on SCell) is 80 milliseconds (ms), and the DRX detection cycle (DRX Cycle) is equal to 80 ms. It should be understood that the SSB and DRX detection cycles in FIG. 3 are only examples, and the SSB and DRX detection cycles are not limited accordingly.

FIG. 3 includes 4 SSBs, 4 PSCHs, 1 wake-up DRX and 4 DRXs. It can be seen that in FIG. 3, the first PSCH from left to right indicates to wake up the terminal to receive service from the base station, and the second to the fourth PSCHs indicates the terminal to sleep. The DRX in FIG. 3 may be understood as DRX ON, that is, the starting boundary of one DRX.

In the embodiment of the present disclosure, the PSCH for waking up the UE to receive service is also called a wake-up signal (WUS), and the PSCH for enabling the UE to enter a sleep state is also called a go-to-sleep (GTS) signal.

III. Type of PSCH

In the 5-th generation (5G) new radio (NR) system, the SSB transmission is system-level (cell-specific), and DRX configuration is separately configured by each terminal (UE-specific), so for different DRX cycles and different UEs, the boundary distances of the SSB and the DRX are not the same, which may be long or short.

Figure 4A:
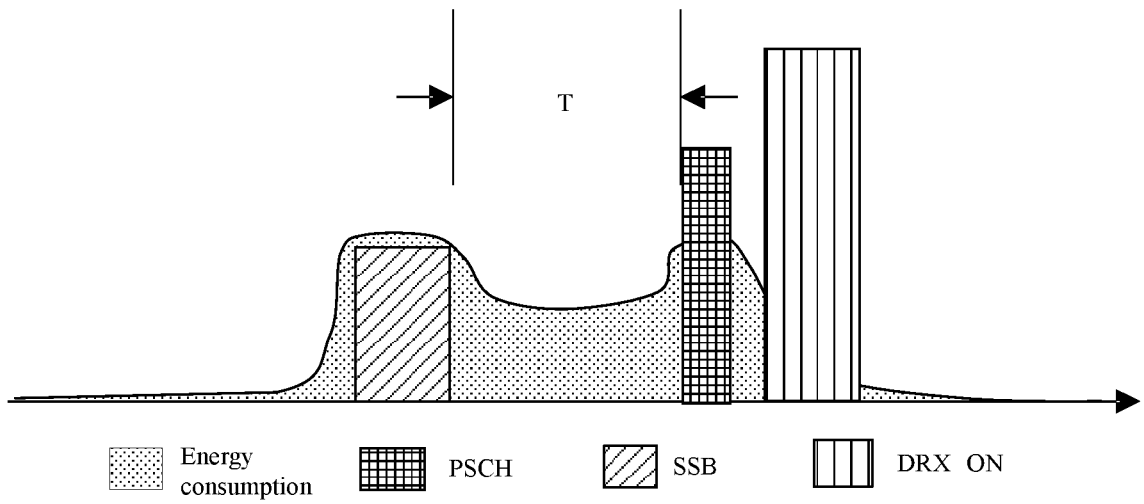
FIG. 4a is a second schematic diagram of a detection position according to an embodiment of the present disclosure.
Figure 4B:
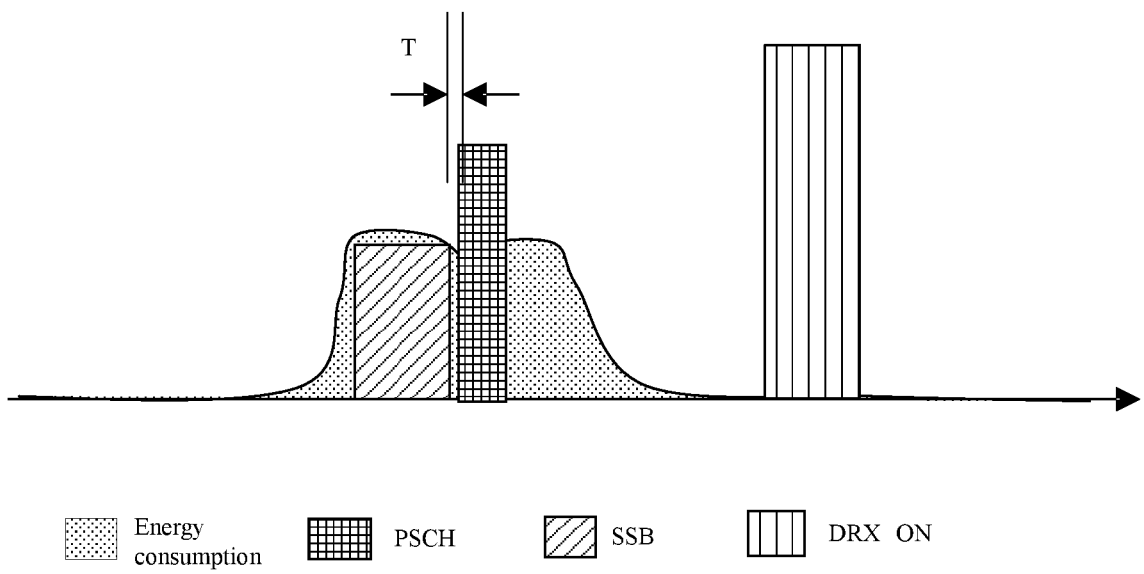
FIG. 4b is a third schematic diagram of a detection position according to an embodiment of the present disclosure.

As shown in FIG. 4a, when the PSCH is relatively close to DRX ON, since the PSCH may be far away from the SSB, the terminal cannot enter deep sleep during the period between SSB and PSCH detection, thereby saving power. As shown in FIG. 4b, when the PSCH is relatively close to the SSB, although it is possible to avoid the situation in FIG. 4a that it is impossible to enter deep sleep for a period of time, it is necessary for the base station to predict whether a service will arrive in the future when the base station is far away from DRX ON.

In FIG. 4a and FIG. 4b, for power consumption, T in FIG. 4a is obviously much larger than T in FIG. 4b, and in actual application, T in FIG. 4b may be closer to or equal to 0.

Figure 5:
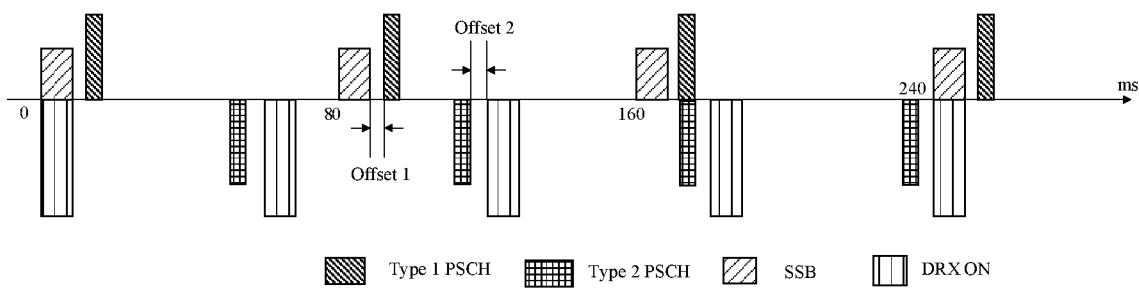
FIG. 5 is a fourth schematic diagram of a detection position according to an embodiment of the present disclosure.

In the embodiment of the present disclosure, the PSCH shown in FIG. 4b may be regarded as Type 1 PSCH, which transmits PSCH at a position closer to the SSB. As shown in FIG. 5, an offset between the Type 1 PSCH and the SSB ending position may be recorded as Offset1. The PSCH shown in FIG. 4a may be regarded as Type2 PSCH, which transmits PSCH before the boundary of the DRX ON. As shown in FIG. 5, the Offset between the Type2 PSCH and the DRX ON may be recorded as Offset2.

In FIG. 5, the detection period of the SSB on SCell is 80 ms, and the detection cycle of the DRX is equal to 60 ms. It should be understood that the SSB and DRX detection cycles in FIG. 5 are only examples, and the SSB detection period and the DRX detection cycle are not limited accordingly. FIG. 5 includes 4 SSBs, 4 Type 1 PSCHs, 4 Type2 PSCHs and 5 DRXs.

The main advantage of the Type 1 PSCH is that when the PSCH is relatively close to SSB, the terminal may perform PSCH reception while performing SSB reception very conveniently. The main purpose of the SSB reception includes video synchronization, measurement, automatic gain control (AGC) and the like. Time-frequency synchronization depends on product implementation, not necessary for each SSB and each DRX cycle. Of course, synchronous maintenance may be made as an independent process from DRX, and products may be made more elaborate. AGC is something to do with a high probability, which needs to be done with SSB. In addition, considering RRM measurement, the SSB closest to the DRX needs to be received with a high probability. Although Type 1 may avoid the situation in FIG. 4a that it is impossible to enter deep sleep for a period of time, it is necessary for the base station to predict whether a service will arrive in the future when the base station is far away from DRX ON, resulting in some limitations of a base station scheduler.

The main advantage of the Type2 PSCH is that when the PSCH is relatively close to DRX ON, it is unnecessary to predict service. However, since the PSCH may be far away from the SSB, the terminal cannot enter deep sleep during the period between SSB and PSCH detection, thereby saving power.

For PSCH, it is also necessary to consider some requirements as follows.

1. A network is optimized to transmit overhead of the PSCH.

In particular, when the terminal is under light load (for example, the wake-up probability is 10%, and there is one wake-up in 10 DRX cycles on average), the overhead of the PSCH transmitted by the network should be as small as possible.

2. For various types of PSCHs, the network may decide to transmit which type of PSCH according to its own strategy. The network may decide to transmit different types of PSCHs at different times so as to achieve an optimal balance between predicting service in advance and making the terminal save as much power as possible.

3. For various types of PSCHs, the terminal may decide to monitor which type of PSCH according to its own electricity-saving strategy. The terminal may decide to monitor different types of PSCHs at different times so as to achieve the best electricity-saving advantage.

III. Possible Actions of the Terminal

The behaviors of the terminal is related to whether the terminal monitors PSCH (that is, whether the terminal performs an operation of monitoring PSCH), whether the terminal monitors PSCH (that is, the terminal performs an operation of monitoring PSCH, but the terminal may monitor PSCH, may also monitor PSCH) and the type of the monitored PSCH. For the convenience of understanding, refer to Table 1.

TABLE 1

Possible actions of the terminal

| Situation | Alternative (Alt) 1 WUS/GTS signal | Alt 2 WUS signal |
|---|---|---|
| has monitored PSCH | Read the content of the PSCH, and decide to wake up or sleep according to the content | Enter wake-up state |
| The network instructs UE to monitor the PSCH, but the UE does not minitor the PSCH | Alt a: enter sleep state Alt b: enter wake-up state | Enter sleep state |
| The network is configured with UE for listening, but the UE does not monitor PSCH | Enter wake-up state | Enter wake-up state |

In the embodiments of the present disclosure, the UE performs the listening operation, but the possible reason for not monitoring PSCH includes: poor channel condition. In addition, in the embodiment of the present disclosure, the meanings of detecting the PSCH, monitoring the PSCH and receiving the PSCH are the same.

The following describes a method for determining a detection position of the embodiment of the present disclosure.

Referring to FIG. 6, FIG. 6 is a first flowchart of a method for determining a detection position according to an embodiment of the present disclosure. As shown in FIG. 6, the method for determining the detection position may include the following steps:

step 601: determining a first detection position for first indication information, where the first detection position is determined based on first configuration information, and the first indication information is used to instruct the terminal to enter a wake-up state or a sleep state.

That is, the terminal may determine the first detection position for the first indication information based on the first configuration information.

In the embodiment of the present disclosure, the first indication information may be represented as the aforementioned PSCH, but it is not limited to this. The first detection position represents the detection position for the first indication information.

In an implementation, the first configuration information may be configured with detection information of a measurement signal. The measurement signal may be SSB, and may also be a channel state information reference signal (CSI-RS), but it is not limited to this. The detection information may include at least one of a detection cycle, an offset and a detection position.

In another implementation, the first configuration information may be directly configured with a first resource for detecting the first indication information. Optionally, the first resource may be a control resource set (CORESET) 0 or a search space 0, but is not limited to this. For example, in some solutions, the first resource may be other CORESETs except the CORESET0, or other search space except the search space 0.

During implementation, the determination manner of the first detection position is associated with the configuration of the first configuration information, that is, configurations of the first configuration information are different, and the determination manners of the first detection position may be different. The specific description is as follows.

Determination Manner I

In the determination manner, detection information for a measurement signal is configured in the first configuration information. Optionally, the step of determining the first detection position for the first indication information includes:
  determining the first detection position for the first indication information according to the detection information of the measurement signal.

In this manner, the detection position for the first indication information may have or not have periodicity. For the first indication information with periodicity and the first indication information without periodicity, the determination manners of the detection position may be different. The determination manners of the detection positions of the first indication information with periodicity and the first indication information without periodicity are described below respectively.

For the detection position for the first indication information with periodicity, optionally, the step of determining the first detection position for the first indication information according to the detection information of the measurement signal includes:
  determining the first detection position for the first indication information according to a detection cycle of the first indication information and a first offset,
  where the detection cycle of the first indication information is determined according to the detection cycle for the measurement signal. Optionally, before the step of determining the first detection position for the first indication information according to the detection cycle of the first indication information and the first offset, the method further includes:
  determining N times of the detection cycle for the measurement signal as the detection cycle of the first indication information according to second configuration information, where the second configuration information indicates that the detection cycle of the first indication information is equal to N times of the detection cycle for the measurement signal, and N is a positive integer.

It may be seen in this scenario that the detection cycle of the first indication information is an integer multiple of the detection cycle of the detection signal. During implementation, the second configuration information may be configured by a network side device, and may also be predefined in a protocol, which may be determined according to the specific situation. The embodiment of the present disclosure is not limited to this.

The first offset is an offset between the detection position for the first indication information and a first reference position.

Optionally, the first reference position may be:
  a detection position of the measurement signal; or
  a boundary position of the detection cycle of the first indication information.

During implementation, the boundary position of the detection cycle of the first indication information may be a starting position or an ending position of the detection cycle of the first indication information.

It should be understood that the implementation manner of determining the first detection position for the first indication information according to the detection cycle of the first indication information and the first offset is related to the expression form of the first reference position. For ease of understanding, example descriptions are as follows.

Assuming that the detection cycle of the first indication information is twice the detection cycle for the measurement signal, the detection cycle for the measurement signal is denoted as T1 and the first offset is denoted as t1.

In a case that the first reference position is the detection position of the measurement signal, the detection position for the first indication information may include 2T1+t1, 4T1+t1, 6T1+t1, and so on.

In a case that the first reference position is the starting position of the detection cycle of the first indication information, the detection position for the first indication information may include T1+t1, 2T1+t1, 3T1+t1, and so on.

During implementation, the terminal may obtain the first offset in various manners. Optionally, before the step of determining the first detection position for the first indication information according to the detection cycle of the first indication information and the first offset, the method further includes:
  determining the first offset configured by third configuration information; or
  determining the first offset according to the detection position of the measurement signal and a detection position of discontinuous reception DRX.

That is, in one manner, the first offset is configured by the third configuration information. In actual application, the second configuration information may be configured by a network side device, and may also be predefined in a protocol, which may be determined according to the specific situation. The embodiment of the present disclosure is not limited to this.

In another manner, the first offset may be determined based on a distance L between the detection position of the measurement signal and the detection position of the discontinuous reception DRX. For example: if L is greater than a preset threshold, the first offset may be set as a first value; and if L is less than or equal to the preset threshold, the first offset may be set as a second value, where the first value is unequal to the second value.

For convenient of understanding, the case where the first reference position is the detection position of the measurement signal and the measurement signal is SSB is taken as an example for description.

When the distance between SSB and the detection position of the DRX ON is large, as shown in FIG. 7a, PSCH is located near SSB, so that the UE can be ensured to enter sleep faster; and when the distance between SSB and the detection position of the DRX is small, as shown in FIG. 7b, PSCH is located near DRX, so that the probability of performing scheduling and prediction by the base station is reduced.

For the detection position for the first indication information without periodicity, optionally, the step of determining the first detection position for the first indication information according to the detection information of the measurement signal includes:

determining the first detection position for the first indication information according to the detection information of the measurement signal and detection information of the DRX.

In the implementation manner I, the terminal may determine the first detection position for the first indication information according to the detection cycle and offset of the measurement signal, and the detection cycle and offset of the DRX.

To facilitate understanding, assuming that the measurement signal is SSB, the detection period and the offset position of the SSB are $T_{SMTC}$ and $O_{SMTC}$ respectively. The detection period of the SSB may be called an SSB-measurement timing configuration (SMTC) cycle. It should be understood that a starting Slot index of each SSB-MTC window is $T_{SMTC} \times i + O_{SMTC}$, where i=0, 1, 2, 3 . . . .

The cycle and the offset position of the DRX are $T_{DRX}$ and $O_{DRX}$ respectively. It should be understood that the starting Slot Index of each DRX ON window is $T_{DRX} \times j + O_{DRX}$, where j=0, 1, 2, 3 . . . .

As shown in FIG. 8, if the Offset of the PSCH and the nearest SSB is 0, the slot number of the occurrence position of the PSCH is: $\text{Floor}[(T_{DRX} \times j + O_{DRX} - O_{SMTC})/T_{SMTC}] \times T_{SMTC} + O_{SMTC}$, where j=0, 1, 2, 3 . . . .

In the implementation manner II, the step of determining the first detection position for the first indication information according to the detection information of the measurement signal and the detection information of the DRX includes:

determining the first detection position for the first indication information according to a second reference position and a second offset;

where the second reference position is the detection position of the measurement signal closest to the detection position of the DRX, and the second offset is an offset between the first detection position and the second reference position.

For convenience of understanding, assuming that the second reference position is T2 and the second offset is t2, the first detection position may be T2+t2. During specific implementation, the second offset may be configured or predefined by the network side device.

It should be noted that for the detection position for the first indication information without periodicity, the manner of determining the first detection position may also be used to determine the detection position for the first indication information with periodicity.

Determination Manner II

In the determination manner, the first configuration information is provided with a first resource for detecting the first indication information. Optionally, the step of determining the first detection position for the first indication information includes:

determining the first resource as the first detection position for the first indication information.

In this way, compared with the determination manner I, the rate of determining the detection position for the first indication information may be increased.

Through comparison between the determination manner I and the determination manner II, the terminal may independently determine the detection position for the first indication information and may enable the setting of the detection position more in line with the actual requirement of the terminal service, so that the reliability of the terminal in detecting the first indication information can be improved.

It should be noted that in the embodiment of the present disclosure, in scenarios where the energy consumption of the terminal is required to be high and it is necessary to reduce the energy consumption as much as possible, the method for the detection position according to the embodiment of the present disclosure may be used to enable the detection position for the first indication information to be as close as possible to the detection position of the measurement signal, so that the sleep time of the terminal can be prolonged, and the energy consumption of the terminal can be reduced.

In scenarios where the requirement on service prediction is high and the accurate rate of the service prediction is required to be high, the method for the detection position according to the embodiment of the present disclosure may be used to enable the detection position for the first indication information to be as close as possible to the detection position of the DRX, so that the accurate rate of the service prediction is increased.

In the embodiment of the present disclosure, the above measurement signal may be any one of the followings: SSB; an SSB set; CSI-RS; a CSI-RS set; and a reference signal.

The above measurement signal may include at least one of the following functions:

for signal synchronization;
for RRM/RLM measurement;
for AGC;
for channel quality measurement; and
for CSI measurement.

In the embodiment of the present disclosure, optionally, after the step of determining the first detection position for the first indication information, the method may further include:

detecting the first indication information at the first detection position.

Optionally, after the step of detecting the first indication information at the first detection position, the method further includes:

entering a wake-up state or a sleep state in a case that the first indication information is not detected.

During implementation, the behavior of the terminal in a case that the first indication information is not detected (that is, entering the wake-up state or the sleep state) may be pre-configured by the network side device, or may be pre-agreed by a protocol, which may be specifically determined according to the actual requirement. The embodiment of the present disclosure is not limited to this.

Optionally, the step of entering the wake-up state or the sleep state includes:

entering the wake-up state or the sleep state according to fourth configuration information, where the fourth configuration information indicates that the terminal enters the wake-up state or the sleep state when the first indication information is not detected, entering the wake-up state in a case that the fourth configuration information indicates that the terminal enters the wake-up state when the first indication information is not detected, or entering the sleep state in a case that the fourth configuration information indicates that the terminal enters the sleep state when the first indication information is not detected.

During implementation, the fourth configuration information is transmitted by the network side device.

In the embodiment of the present disclosure, the terminal starts to enter the wake-up state or the sleep state from a reference time, which may include at least one of the following behaviors:

waking up/sleeping;

starting to detect PDCCH/not detecting PDCCH;

changing the number of PDCCH blind detection; and changing configuration of an antenna;

where the reference time may be: the boundary of a next (or a plurality of) DRX cycles, or N time slots after the first indication information is detected, N being a network-configured or predefined value.

In this embodiment of the present disclosure, optionally, the method further includes:

detecting second indication information at a second detection position, where the second indication information is used to instruct the terminal to enter a wake-up state or a sleep state.

It should be understood that the first indication information and the second indication information have the same function, but the detection positions of the first indication information and the second indication information may be different.

In the embodiment of the present disclosure, optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

In actual application, for the convenience of distinguishing the first indication information and the second indication information, the RNTI carried by the first indication information and the second indication information may be different, and the CRC scrambling manners of the first indication information and the second indication information are different.

In addition, in actual application, the first indication information and the second indication information may be transmitted through downlink control information (DCI). Therefore, for the convenience of distinguishing the first indication information and the second indication information, the formats or load magnitudes of DCI for transmitting the first indication information and the second indication information may be different. Of course, a first field may be added to the DCI for distinguish the first field of the first indication information from the first field of the second indication information.

In this way, the terminal may distinguish the first indication information from the second indication information, thereby receiving indication information at the detection positions corresponding to the first indication information and the second indication information respectively, and increasing the success rate of receiving the indication information.

In this embodiment of the present disclosure, optionally, the method further includes:

determining detected first target indication information according to fifth configuration information, where the fifth configuration information indicates that the terminal detects the first target indication information;

detecting second target indication information at a detection position corresponding to the second target indication information when the first target indication information is not detected at the detection position corresponding to the first target indication information; and detecting the second target indication information at a detection position corresponding to the second target indication information when the first target indication information is not detected;

where the first target indication information is one of the first indication information and the second indication information, and the second target indication information is the other one, except the target indication information, of the first indication information and the second indication information.

In this way, the terminal may determine to enter the wake-up or sleep state by detecting the second target indication information.

Optionally, the method further includes:

giving up detecting the second target indication information at the detection position corresponding to the second target indication information in a case that the first target indication information is detected at the detection position corresponding to the first target indication information and the first target indication information indicates the terminal to enter the sleep state;

where the first target indication information is one of the first indication information and second indication information, and the second target indication information is the other one, except the target indication information, of the first indication information and the second indication information.

In this way, the power consumption of the terminal may be reduced, and the power may be saved.

It should be noted that the various optional implementations described in the embodiments of the present disclosure may be implemented in combination with each other or may be implemented separately, which is not limited in the embodiments of the present disclosure.

For ease of understanding, example descriptions are as follows:

In the embodiment I, there is only one type of PSCH in the system.

Optionally, PSCH of this embodiment may be Type 1 PSCH.

The detection cycle of the Type 1 PSCH may be determined by the following manners:

the network indicates that the cycle of detecting the Type 1 PSCH by the terminal is equal to N times the cycle of the SSB-MTC, where N is a positive integer.

The Offset1 of the Type 1 PSCH and SSB may be determined by the following manners.

1. Offset 1 is configured by the network.

2. Offset 1 is determined according to the relative position of the SSB and DRX ON.

For the manner 2, Offset 1 is a function of a distance between SSB and DRX ON. Offset1=Function($i_{SSB}$, $i_{DRX}$), where $i_{DRX}$ is the detection position corresponding to DRX, for example, the number of a slot corresponding to DRX ON; and $i_{SSB}$ is the detection position of the SSB or SSB-MTC corresponding to DRX, for example, the number of the Slot of the SSB or SSB-MTC corresponding to DRX.

SSB corresponding to DRX may be the previous SSB of the DRX, but is not limited to this. The SSB-MTC is a set of the SSB, including a plurality of the SSBs to form a multi-Slot window.

During specific implementation, when the distance between the SSB and the DRX ON is large, as shown in FIG.

7a, PSCH is located near SSB, so that the UE can be ensured to enter sleep faster; and when the distance between SSB and DRX is small, as shown in FIG. 7b, PSCH is located near DRX, so that the probability of performing scheduling and prediction by the base station is reduced.

The detection position of the Type 1 PSCH may be determined by the following manners.

1. the position where the terminal detects the PSCH is calculated according to the cycles of the SSB-MTC and the DRX.

When the cycles of the SSB-MTC and the DRX do not have a multiple or divisor relationship and the terminal is required to detect the PSCH only around one SSB closest to the DRX ON position, the interval between the two adjacent PSCHs will not be fixed, as shown in FIG. 8.

To facilitate understanding, it is assumed that the cycle and the offset position of the SSB-MTC are $T_{SMTC}$ and $O_{SMTC}$ respectively. It should be understood that the starting Slot index of each SSB-MTC window is $T_{SMTC} \times i + O_{SMTC}$, where i=0, 1, 2, 3 . . . .

The cycle and the offset position of the DRX are $T_{DRX}$ and $O_{DRX}$ respectively. It should be understood that the starting Slot Index of each DRX ON window is $T_{DRX} \times j + O_{DRX}$, where j=0, 1, 2, 3 . . . .

As shown in FIG. 8, if the Offset of the PSCH and the nearest SSB is 0, the slot number of the occurrence position of the PSCH is: $Floor[(T_{DRX} \times j + O_{DRX} - O_{SMTC})/T_{SMTC}] \times T_{SMTC} + O_{SMTC}$, where j=0, 1, 2, 3 . . . .

The SSB-MTC in the above embodiment may also be other measurement signals, for example, the above measurement signal may be any one of the followings: SSB; an SSB set; CSI-RS; a CSI-RS set; and a reference signal.

The method in the above embodiment is equivalent to determining the first detection position for the first indication information according to the detection information of the measurement signal and the detection information of the DRX, and includes:

determining the first detection position for the first indication information according to a second reference position and a second offset, where the second reference position is the detection position of the measurement signal closest to the detection position of the DRX, and the second offset is an offset between the first detection position and the second reference position.

If the Offset of the PSCH and the nearest SSB is not 0, that is, the second offset is not 0, the slot number of the occurrence position of the PSCH is: $Floor[(T_{DRX} \times j + O_{DRX} - O_{SMTC})/T_{SMTC}] \times T_{SMTC} + O_{SMTC} + O_{offset}$, where j=0, 1, 2, 3 . . . $O_{offset}$ is the second offset and may be pre-configured by the network or be determined according to the predefined method.

2. The terminal detects the PSCH at the CORESET0 or the search space (SS) 0. The CORESET0/SS0 is a specific configuration, is informed to the terminal by the network through broadcast information/system information, and is used to detect the system information.

Of course, the detection position of the Type 1 PSCH may also be determined by the configuration solution of other CORESET and SS.

The behavior of the terminal may include at least one of the followings.

1. when the terminal does not receive the PSCH (for example, the PSCH is not received due to the poor channel condition), the network selects one of the following two behaviors as the behavior of the terminal:
the terminal enters the sleep state; and
the terminal enters the wake-up state.

2. When the network is configured with a UE to listen, but the UE does not receive the PDCCH (for example, the PDCCH is not received due to the poor channel condition), the terminal enters the sleep state.

3. When the network is configured with the UE to listen, but the UE does not receive the PDCCH (for example, the PDCCH is not received due to the poor channel condition), the terminal enters the wake-up state.

In the embodiment II, there are two types of PSCHs in the system.

Optionally, the PSCH of this embodiment may be Type 1 PSCH and Type 2 PSCH.

Distinguish different PSCHs.

In view of the network, the network indicates that the terminal receives two types of energy-saving control signaling, with different RNTI or DCI format or CRC scrambling or specific fields in the DCI.

In view of the terminal, the network indicates that TERMINAL receives two types of energy-saving control signaling, with different RNTI or DCI format or CRC scrambling.

If there are various types of PSCHs, the terminal may decide to monitor which type of PSCH according to its own electricity-saving strategy. The terminal may decide to monitor different types of PSCHs at different times. Some possible terminal behaviors are any one of the followings:

the terminal detects the PSCH at a position closest to the SSB;

the network is configured with the UE to monitor the Type 1 PSCH, but the UE does not receive the PDCCH (for example, the PDCCH is not received due to the poor channel condition), then the UE listens to the Type 2 PSCH;

the terminal is configured with the UE to monitor the Type 1 PSCH, but the UE does not receive the Type 1 PSCH, then the UE listens to the Type 2 PSCH; and the terminal detects that the Type 1 PSCH indicates the terminal to enter the sleep state, then the terminal does not detect the Type 2 PSCH any longer.

The following describes the configuration method in the embodiments of the present disclosure.

Referring to FIG. 9, FIG. 9 is a first flowchart of a configuration method according to an embodiment of the present disclosure. As shown in FIG. 9, the configuration method may include the following steps:

Step 901: transmitting first configuration information, where the first configuration information is used for a terminal to determine a first detection position for first indication information, and the first indication information is used to instruct the terminal to enter a wake-up state or a sleep state.

Optionally, detection information for a measurement signal is configured in the first configuration information.

Optionally, the method further includes:

transmitting second configuration information, wherein the second configuration information indicates that a detection cycle of the first indication information is equal to N times of the detection cycle for the measurement signal, and N is a positive integer.

Optionally, the method further includes:

transmitting third configuration information, where the third configuration information is configured with a first offset or a second offset.

The first offset is an offset between the detection position for the first indication information and a first reference position, and the second offset is an offset between a first detection position and a second reference position.

Optionally, the first configuration information indicates a first resource is used for detecting the first indication information, and the first resource is a control resource set CORESET0 or a search space 0.

Optionally, the method further includes:
transmitting fourth configuration information, wherein the fourth configuration information indicates that the terminal enters a wake-up state or a sleep state when the first indication information is not detected.

Optionally, the method further includes:
transmitting fifth configuration information, wherein the fifth configuration information indicates that the terminal detects the first indication information and the second indication information, and the second indication information is used to instruct the terminal to enter a wake-up state or a sleep state.

Optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

It should be noted that this embodiment serves as an implementation of the network side device corresponding to the above method embodiment; therefore, the related description may be referenced to the related description in the above method embodiment, and the same beneficial effect may be achieved. To avoid repeated description, details are not described herein again.

Referring to FIG. 10, FIG. 10 is a first structural diagram of a terminal according to an embodiment of the present disclosure. As shown in FIG. 10, the terminal 1000 includes:
a first determination module 1001, configured to determine a first detection position for first indication information, where the first detection position is determined based on first configuration information, and the first indication information is used to instruct the terminal to enter a wake-up state or a sleep state.

Optionally, the first determination module 1001 is configured to, in a case that detection information for a measurement signal is configured in the first configuration information, determine the first detection position for the first indication information according to the detection information of the measurement signal.

Optionally, the first determination module 1001 is configured to, in a case that the first configuration information is configured with detection information of the measurement signal, determine the first detection position for the first indication information according to the detection cycle of the first indication information and a first offset;
where the detection cycle of the first indication information is determined according to the detection cycle for the measurement signal, and the first offset is an offset between a detection position for the first indication information and a first reference position.

Optionally, the first reference position is:
a detection position of the measurement signal; or
a boundary position of the detection cycle of the first indication information.

Optionally, the terminal 1000 further includes:
a second determination module, configured to determine N times of the detection cycle for the measurement signal as the detection cycle of the first indication information according to second configuration information, where the second configuration information indicates that the detection cycle of the first indication information is equal to N times of the detection cycle for the measurement signal, and N is a positive integer.

Optionally, the terminal 1000 may further include:
a third determination module, configured to determine the first offset configured by third configuration information; or
a fourth determination module, configured to determine the first offset according to the detection position of the measurement signal and a detection position of discontinuous reception DRX.

Optionally, the first determination module 1001 is configured to, in a case that the first configuration information is configured with detection information of the measurement signal, determine the first detection position for the first indication information according to the detection information of the measurement signal and the detection information of the DRX.

Optionally, the first determination module 1001 is configured to, in a case that the first configuration information is configured with detection information of the measurement signal, determine the first detection position for the first indication information according to a second reference position and a second offset;
where the second reference position is the detection position of the measurement signal closest to the detection position of the DRX, and the second offset is an offset between the first detection position and the second reference position.

Optionally, the first determination module 1001 is configured to, in a case that the first configuration information indicates a first resource is used for detecting the first indication information, determine the first resource as the first detection position for the first indication information, where the first resource is a control resource set CORESET0 or a search space 0.

Optionally, the terminal 1000 further includes:
a first detection module, configured to detect the first indication information at the first detection position.

Optionally, the terminal 1000 further includes:
an entering module, configured to enter a wake-up state or a sleep state in a case that the first indication information is not detected.

Optionally, the entering module is configured to enter the wake-up state or the sleep state according to fourth configuration information, where the fourth configuration information indicates that the terminal enters the wake-up state or the sleep state when the first indication information is not detected.

The entering module enters the wake-up state in a case that the fourth configuration information indicates that the terminal enters the wake-up state when the first indication information is not detected, or enters the sleep state in a case that the fourth configuration information indicates that the terminal enters the sleep state when the first indication information is not detected.

Optionally, the terminal 1000 further includes:
a second detection module, configured to detect second indication information at a second detection position, where the second indication information is used to instruct the terminal to enter a wake-up state or a sleep state.

Optionally, the terminal 1000 further includes:
a fifth determination module, configured to determine detected first target indication information according to fifth configuration information, where the fifth configuration information indicates that the terminal detects the first target indication information;
detect second target indication information at a detection position corresponding to the second target indication information when the first target indication information is not detected at the detection position corresponding to the first target indication information; and
detect the second target indication information at a detection position corresponding to the second target indication information when the first target indication information is not detected;
where the first target indication information is one of the first indication information and the second indication information, and the second target indication information is the other one, except the target indication information, of the first indication information and the second indication information.

Optionally, the terminal 1000 further includes:
a giving-up module, configured to give up detecting the second target indication information at the detection position corresponding to the second target indication information in a case that the first target indication information is detected at the detection position corresponding to the first target indication information and the first target indication information indicates the terminal to enter the sleep state;
where the first target indication information is one of the first indication information and second indication information, and the second target indication information is the other one, except the target indication information, of the first indication information and the second indication information.

Optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

The terminal 1000 can implement each process implemented by the terminal in the foregoing method embodiments of the present disclosure, and achieve the same beneficial effects. To avoid repetition, details are not described herein again.

Referring to FIG. 11, FIG. 11 is a first structural diagram of a network side device according to an embodiment of the present disclosure. As shown in FIG. 11, the network side device 1100 further includes:
a first transmitting module 1101, configured to transmit first configuration information, where the first configuration information is used for a terminal to determine a first detection position for first indication information, and the first indication information is used to instruct the terminal to enter a wake-up state or a sleep state.

Optionally, detection information for a measurement signal is configured in the first configuration information.

Optionally, the network side device 1100 includes:
a second transmitting module, configured to transmit second configuration information, where the second configuration information indicates that the detection cycle of the first indication information is equal to N times of the detection cycle for the measurement signal, and N is a positive integer.

Optionally, the network side device 1100 includes:
a third transmitting module, configured to transmit third configuration information, where the third configuration information is configured with a first offset or a second offset.

The first offset is an offset between the detection position for the first indication information and a first reference position, and the second offset is an offset between a first detection position and a second reference position.

Optionally, the first configuration information indicates a first resource is used for detecting the first indication information, and the first resource is a control resource set CORESET0 or a search space 0.

Optionally, the network side device 1100 includes:
a fourth transmitting module, configured to transmit fourth configuration information, where the fourth configuration information indicates that the terminal enters a wake-up state or a sleep state when the first indication information is not detected.

Optionally, the network side device 1100 includes:
a fifth transmitting module, configured to transmit fifth configuration information, where the fifth configuration information indicates that the terminal detects the first indication information and the second indication information, and the second indication information is used to instruct the terminal to enter a wake-up state or a sleep state.

Optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

The network side device 1100 can implement each process implemented by the network side device in the foregoing method embodiments of the present disclosure, and achieve same beneficial effects. To avoid repetition, details are not described herein again.

Figure 12:
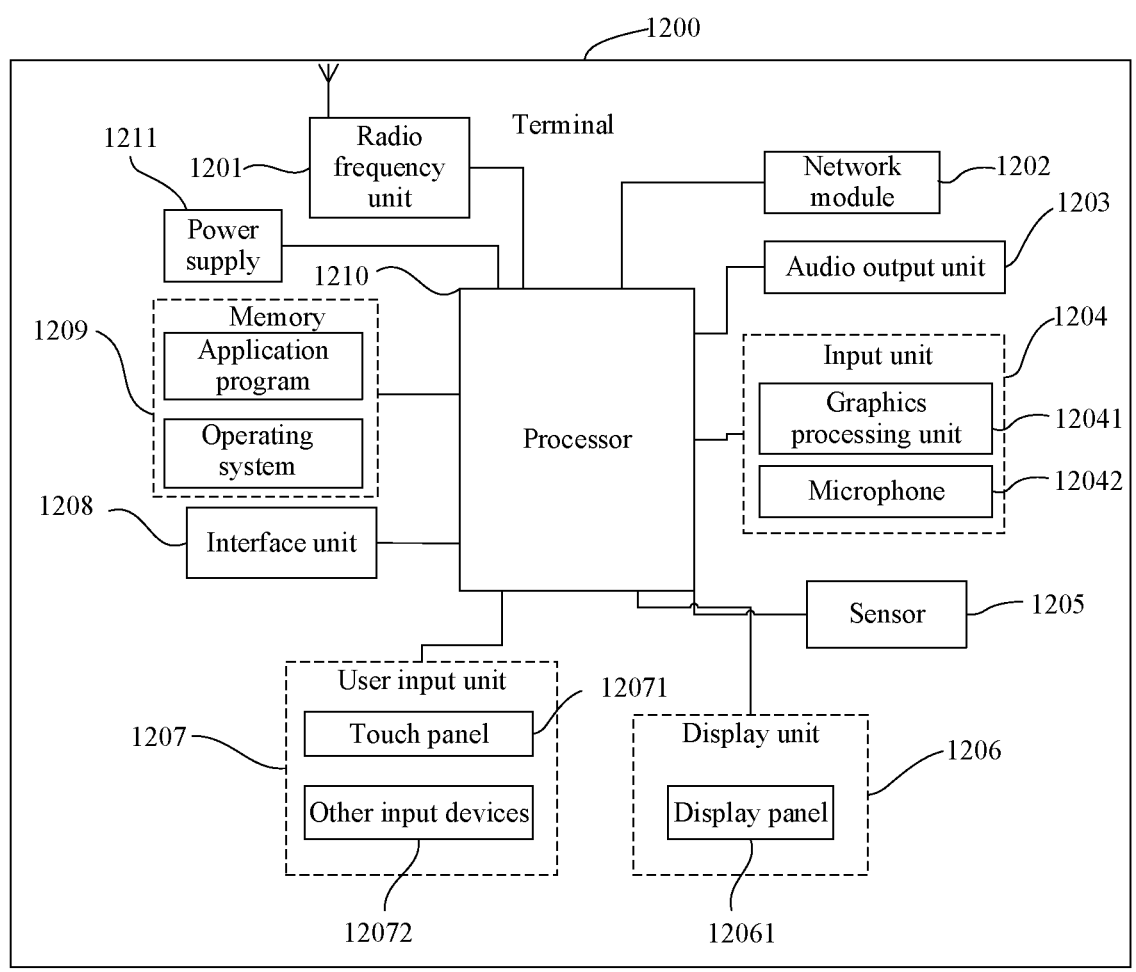
FIG. 12 is a second structural diagram of a terminal according to an embodiment of the present disclosure.

Referring to FIG. 12, FIG. 12 is a second structural diagram of a terminal according to an embodiment of the present disclosure. The terminal may be shown in a schematic diagram of a hardware structure of a terminal implementing the embodiments of the present disclosure. As shown in FIG. 12, the terminal 1200 includes but is not limited to: a radio frequency unit 1201, a network module 1202, an audio output unit 1203, an input unit 1204, a sensor 1205, a display unit 1206, a user input unit 1207, an interface unit 1208, a memory 1209, a processor 1210, a power supply 1211, and the like. Those skilled in the art may understand that the terminal structure shown in FIG. 12 does not constitute a limitation on the terminal. The terminal may include more or fewer components than those shown in the figure, or some components may be combined, or there may be a different component arrangement. In this embodiment of this disclosure, the terminal includes but is not limited to a mobile phone, a tablet computer, a notebook computer, a palmtop computer, a vehicle-mounted terminal, a wearable device, a pedometer, or the like.

The processor 1210 is configured to determine a first detection position for first indication information, where the first detection position is determined based on first configuration information, and the first indication information is used to instruct the terminal to enter a wake-up state or a sleep state.

Optionally, the step of determining the first detection position for the first indication information by the processor 1210 includes:

in a case that detection information for a measurement signal is configured in the first configuration information, determining the first detection position for the first indication information according to the detection information of the measurement signal.

Optionally, the step of determining the first detection position for the first indication information by the processor 1210 according to the detection information of the measurement signal includes:

determining the first detection position for the first indication information according to a detection cycle of the first indication information and a first offset;

where the detection cycle of the first indication information is determined according to the detection cycle for the measurement signal, and the first offset is an offset between a detection position for the first indication information and a first reference position.

Optionally, the first reference position is:
a detection position of the measurement signal; or
a boundary position of the detection cycle of the first indication information.

Optionally, before the step of determining the first detection position for the first indication information according to the detection cycle of the first indication information and the first offset, the processor 1210 is further configured to:

determine N times of the detection cycle for the measurement signal as the detection cycle of the first indication information according to second configuration information, where the second configuration information indicates that the detection cycle of the first indication information is equal to N times of the detection cycle for the measurement signal, and N is a positive integer.

Optionally, before the step of determining the first detection position for the first indication information according to the detection cycle of the first indication information and the first offset, the processor 1210 is further configured to:

determine the first offset configured by third configuration information; or
determine the first offset according to the detection position of the measurement signal and a detection position of discontinuous reception DRX.

Optionally, the step of determining the first detection position for the first indication information by the processor 1210 according to the detection information of the measurement signal includes:

determining the first detection position for the first indication information according to the detection information of the measurement signal and detection information of the DRX.

Optionally, the step of determining the first detection position for the first indication information by the processor 1210 according to detection information of the measurement signal and the detection information of the DRX includes:

determining the first detection position for the first indication information according to a second reference position and a second offset;
where the second reference position is the detection position of the measurement signal closest to the detection position of the DRX, and the second offset is an offset between the first detection position and the second reference position.

Optionally, the step of determining the first detection position for the first indication information by the processor 1210 includes:

in a case that the first configuration information indicates a first resource is used for detecting the first indication information, determining the first resource as the first detection position for the first indication information, where the first resource is a control resource set CORESET0 or a search space 0.

Optionally, after the step of determining the first detection position for the first indication information, a radio frequency unit 1201 is configured to:

detect the first indication information at the first detection position.

Optionally, after the step of detecting the first indication information at the first detection position, the processor 1210 or the radio frequency unit 1201 is further configured to:

enter a wake-up state or a sleep state in a case that the first indication information is not detected.

Optionally, the step of entering the wake-up state or the sleep state includes:

entering the wake-up state or the sleep state according to fourth configuration information, where the fourth configuration information indicates that the terminal enters the wake-up state or the sleep state when the first indication information is not detected;
entering the wake-up state in a case that the fourth configuration information indicates that the terminal enters the wake-up state when the first indication information is not detected; or entering the sleep state in a case that the fourth configuration information indicates that the terminal enters the sleep state when the first indication information is not detected.

Optionally, the radio frequency unit 1201 is further configured to:

detect second indication information at a second detection position, where the second indication information is used to instruct the terminal to enter a wake-up state or a sleep state.

Optionally, the processor 1210 or the radio frequency unit 1201 is further configured to:

determine detected first target indication information according to fifth configuration information, where the fifth configuration information indicates that the terminal detects the first target indication information;
detect second target indication information at a detection position corresponding to the second target indication information when the first target indication information is not detected at the detection position corresponding to the first target indication information; and
detect the second target indication information at a detection position corresponding to the second target indication information when the first target indication information is not detected;
where the first target indication information is one of the first indication information and the second indication information, and the second target indication information is the other one, except the target indication information, of the first indication information and the second indication information.

Optionally, the processor 1210 or the radio frequency unit 1201 is further configured to:

give up detecting the second target indication information at the detection position corresponding to the second target indication information in a case that the first target indication information is detected at the detection position corresponding to the first target indication information and the first target indication information indicates the terminal to enter the sleep state;

where the first target indication information is one of the first indication information and second indication information, and the second target indication information is the other one, except the target indication information, of the first indication information and the second indication information.

Optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

It should be noted that the terminal 1200 in this embodiment may implement each process that can be implemented by the terminal in the method embodiment of the embodiments of the present disclosure, and achieve same beneficial effects. To avoid repetition, details are not described herein again.

It should be understood that, in this embodiment of the present disclosure, the radio frequency unit 1201 may be configured to receive and send information or a signal in a call process. For example, after receiving downlink data from a base station, the radio frequency unit 1201 sends the downlink data to the processor 1210 for processing. In addition, the radio frequency unit 1201 sends uplink data to the base station. Usually, the radio frequency unit 1201 includes but is not limited to an antenna, at least one amplifier, a transceiver, a coupler, a low noise amplifier, a duplexer, and the like. In addition, the radio frequency unit 1201 may communicate with a network and other devices by using a wireless communication system.

The terminal provides a user with wireless broadband Internet access by using the network module 1202, for example, helping the user send and receive emails, browse web pages, and access streaming media.

The audio output unit 1203 may convert audio data received by the radio frequency unit 1201 or the network module 1202 or stored in the memory 1209 into an audio signal and output the audio signal as a sound. Moreover, the audio output unit 1203 may further provide audio output related to a specific function performed by the terminal 1200 (such as a call signal reception sound, a message reception sound, or the like). The audio output unit 1203 includes a speaker, a buzzer, a telephone receiver, etc.

The input unit 1204 is configured to receive an audio or video signal. The input unit 1204 may include a graphics processing unit (GPU) 12041 and a microphone 12042. The graphics processing unit 12041 is configured to process image data of a static picture or a video obtained by an image capture device (for example, a camera) in video capture mode or image capture mode. A processed image frame can be displayed on the display unit 1206. The image frame processed by the graphics processing unit 12041 may be stored in the memory 1209 (or another storage medium) or transmitted via the radio frequency unit 1201 or the network module 1202. The microphone 12042 may receive a sound and can process such sound into audio data. The processed audio data may be converted, in a call mode, into a format that may be transmitted to a mobile communication base station by using the radio frequency unit 1201 for output.

The terminal 1200 further includes at least one sensor 1205, for example, a light sensor, a motion sensor, and another sensor. The light sensor includes an ambient light sensor and a proximity sensor. The ambient light sensor may adjust luminance of the display panel 12061 based on brightness of ambient light. The proximity sensor may turn off the display panel 12061 and/or backlight when the terminal 1200 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1206 is configured to display information entered by a user or information provided for a user. The display unit 1206 may include a display panel 12061, and the display panel 12061 may be configured in a form of liquid crystal display (LCD), organic light-emitting diode (OLED), or the like.

The user input unit 1207 can be configured to receive the inputted digital or character information, and generate key signal input related to user setting and function control of the terminal. The user input unit 1207 includes a touch panel 12071 and another input device 12072. The touch panel 12071, also called a touch screen, may collect touch operation on or near the touch panel by users (for example, operation on the touch panel 12071 or near the touch panel 12071 by fingers or any suitable objects or accessories such as a touch pen by the users). The touch panel 12071 may include two parts: a touch detection device and a touch controller. The touch detection device detects a touch position of a user, detects a signal brought by a touch operation, and transmits the signal to the touch controller. The touch controller receives touch information from the touch detection device, converts the touch information into contact coordinates, sends the contact coordinates to the processor 1210, and receives and executes a command from the processor 1210. In addition, the touch panel 12071 may be implemented in various types such as a resistor, a capacitor, an infrared ray, or a surface acoustic wave. In addition to the touch panel 12071, the user input unit 1207 may further include other input devices 12072. The other input devices 12072 may include but are not limited to: a physical keyboard, a function key (such as a volume control key, a switch key), a trackball, a mouse, and a joystick, which is no longer repeated here.

Optionally, the touch panel 12071 may cover the display panel 12061. When detecting the touch operation on or near the touch panel 12071, the touch panel 12071 transmits the touch operation to the processor 1210 to determine a type of a touch event, and then the processor 1210 provides corresponding visual output on the display panel 12061 based on the type of the touch event. In FIG. 12, the touch panel 12071 and the display panel 12061 are used as two independent components to implement input and output functions of the terminal. However, in some embodiments, the touch panel 12071 and the display panel 12061 may be integrated to implement the input and output functions of the terminal. This is not specifically limited herein.

The interface unit 1208 is an interface connecting an external device to the terminal 1200. For example, the external device may include a wired or wireless headphone port, an external power supply (or a battery charger) port, a wired or wireless data port, a storage card port, a port used to connect to an device having an identity module, an audio input/output (I/O) port, a video I/O port, and a headset port. The interface unit 1208 may be configured to receive an input (such as data information, electric power) from the external device and transmit the received input to one or more elements within the terminal 1200, or the interface unit 1208 may be configured to transmit data between the terminal 1200 and the external device.

The memory 1209 may be configured to store a software program as well as every kind of data. The memory 1209 may mainly include a program storage area and a data storage area. The program storage area may store an operating system, an application required by at least one function (for example, an audio playing function and an image playing function), and the like. The data storage area may store data (for example, audio data and an address book) created according to use of the mobile phone. In addition, the memory 1209 may include a high speed random access memory, and may further include a non-volatile memory, for example, at least one magnetic disk memory device, a flash memory device, or other non-volatile solid state memory devices.

The processor 1210 is a control center of the terminal, and is connected to all the parts of the entire terminal by using various interfaces and lines. It performs various functions of the terminal and processes data by running or executing the software programs and/or modules stored in the memory 1209 and by invoking data stored in the memory 1209, it performs overall monitoring of the terminal. The processor 1210 may include one or more processing units. Optionally, the processor 1210 may be integrated with an application processor and a modem processor. The application processor mainly processes the operating system, the user interface, applications, etc. The modem processor mainly processes wireless communication. It may be understood that, alternatively, the modem processor may not be integrated into the processor 1210.

The terminal 1200 may also include a power supply 1211 (for example, a battery) that supplies power to various components. Optionally, the power supply 1211 may be logically connected to the processor 1210 through a power supply management system, to perform functions of managing charging, discharging, and power consumption through the power supply management system.

In addition, the terminal 1200 includes some functional modules not shown. Details are not described herein again.

Optionally, an embodiment of the present disclosure further provides a terminal, including a processor 1210, a memory 1209, and a computer program that is stored in the memory 1209 and that can run on the processor 1210. When the computer program is executed by the processor 1210, the processes of the foregoing method embodiment for determining the detection position are implemented and a same technical effect can be achieved. To avoid repetition, details are not described herein again.

Figure 13:
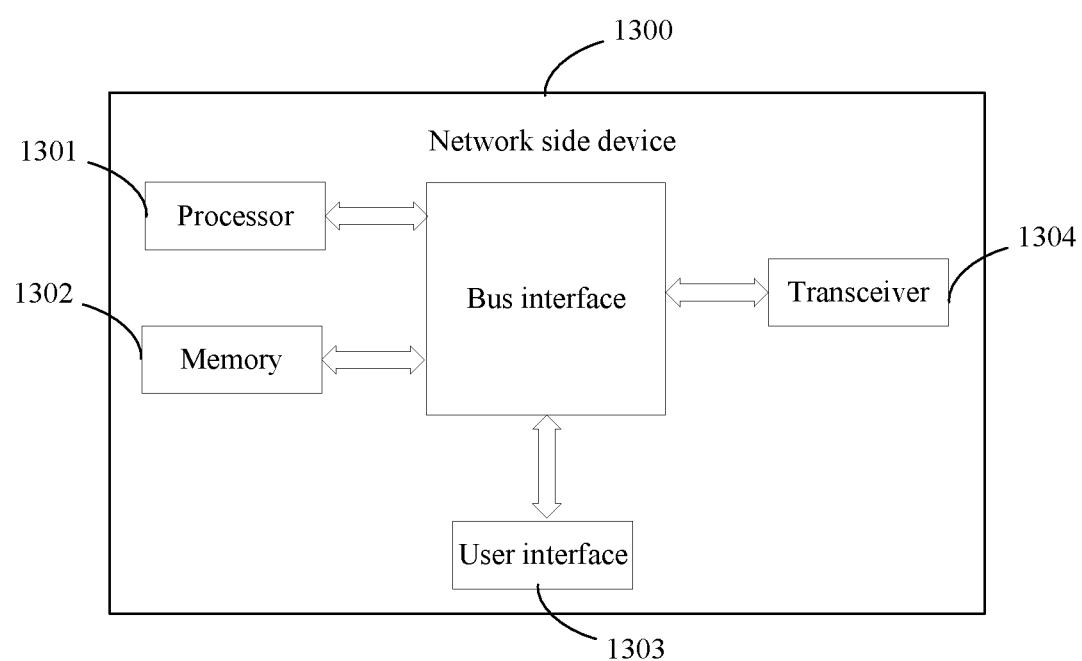
FIG. 13 is a second structural diagram of a network side device according to an embodiment of the present disclosure.

Referring to FIG. 13, FIG. 13 is a second structural diagram of a network side device according to an embodiment of the present disclosure. As shown in FIG. 13, a network side device 1300 includes a processor 1301, a memory 1302, a user interface 1303, a transceiver 1304, and a bus interface.

A transceiver 1304 is configured to transmit first configuration information, where the first configuration information is used for a terminal to determine a first detection position for first indication information, and the first indication information is used to instruct the terminal to enter a wake-up state or a sleep state.

Optionally, detection information for a measurement signal is configured in the first configuration information.

Optionally, the transceiver 1304 is further configured to: transmitting second configuration information, wherein the second configuration information indicates that a detection cycle of the first indication information is equal to N times of the detection cycle for the measurement signal, and N is a positive integer.

Optionally, the transceiver 1304 is further configured to: transmitting third configuration information, where the third configuration information is configured with a first offset or a second offset.

The first offset is an offset between the detection position for the first indication information and a first reference position, and the second offset is an offset between a first detection position and a second reference position.

Optionally, the first configuration information indicates a first resource is used for detecting the first indication information, and the first resource is a control resource set CORESET0 or a search space 0.

Optionally, the transceiver 1304 is further configured to: transmitting fourth configuration information, where the fourth configuration information indicates that the terminal enters a wake-up state or a sleep state when the first indication information is not detected.

Optionally, the transceiver 1304 is further configured to: transmitting fifth configuration information, wherein the fifth configuration information indicates that the terminal detects the first indication information and the second indication information, and the second indication information is used to instruct the terminal to enter a wake-up state or a sleep state.

Optionally, at least one of the following parameters of the first indication information and the second indication information is different: radio network temporary identity RNTI; a format of downlink control information DCI; a scrambling mode of cyclical redundancy check CRC; a first field of DCI for distinguishing the first indication information and the second indication information; and a magnitude of load of DCI.

In FIG. 13, the bus architecture may include any number of interconnected buses and bridges, which may be linked together by various circuits of one or more processors represented by the processor 1301 and a memory represented by the memory 1302. The bus architecture may further link together various other circuits such as peripheral devices, voltage regulators, and power management circuits. These are all known in the art, and therefore, no further description is provided herein. The bus interface provides an interface. The transceiver 1304 may include a plurality of elements, that is, include a transmitter and a receiver, and provide units for communication with various other devices on a transmission medium. For different user equipment, the user interface 1303 may alternatively be an interface for externally and internally connecting a required device. The connected device includes, but not limited to, a keypad, a display, a loudspeaker, a microphone, a joystick, and the like.

The processor 1301 is responsible for management of a bus architecture and general processing. The memory 1302 may store data used when the processor 2601 performs an operation.

The network side device 1300 can implement each process implemented by the network side device in the foregoing method embodiments. To avoid repetition, details are not described herein again.

An embodiment of the present disclosure further provides a non-transitory computer readable storage medium. The non-transitory computer readable storage medium stores a computer program, where when the computer program is executed by a processor, the processes of the foregoing method embodiment for determining the detection position or the configuration method are implemented, or when the computer program is executed by the processor, the processes of the above configuration method embodiment are implemented, and a same technical effect can be achieved. To avoid repetition, details are not described herein again. The non-transitory computer readable storage medium includes a read-only memory (ROM), a random access memory (RAM), a magnetic disk, or a compact disc.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. Without being subject to further limitations, an element defined by a phrase "including a . . . " does not exclude presence of other identical elements in the process, method, article, or device that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A method for determining a detection position, applied to a terminal and comprising:
   determining a first detection position for first indication information, wherein the first detection position is determined based on first configuration information, and the first indication information is used to instruct the terminal to enter a wake-up state or a sleep state;
   detecting the first indication information at the first detection position; and
   entering, in a case that the first indication information is not detected, a wake-up state or a sleep state according to fourth configuration information transmitted by a network device, wherein the fourth configuration information indicates that the terminal enters the wake-up state or the sleep state when the first indication information is not detected.

2. The method according to claim 1, wherein the determining the first detection position for the first indication information comprises:
   in a case that detection information for a measurement signal is configured in the first configuration information, determining the first detection position for the first indication information according to the detection information for the measurement signal.

3. The method according to claim 2, wherein the determining the first detection position for the first indication information according to the detection information of the measurement signal comprises:
   determining the first detection position for the first indication information according to a detection cycle of the first indication information and a first offset;
   wherein the detection cycle of the first indication information is determined according to the detection cycle for the measurement signal, and the first offset is an offset between a detection position for the first indication information and a first reference position.

4. The method according to claim 3, wherein the first reference position is:
   a detection position for the measurement signal; or
   a boundary position of the detection cycle for the first indication information.

5. The method according to claim 3, wherein before the determining the first detection position for the first indication information according to the detection cycle of the first indication information and the first offset, the method further comprises:
   determining N times of the detection cycle for the measurement signal as the detection cycle of the first indication information according to second configuration information, wherein the second configuration information indicates that the detection cycle of the first indication information is equal to N times of the detection cycle for the measurement signal, and N is a positive integer.

6. The method according to claim 3, wherein before the determining the first detection position for the first indication information according to the detection cycle of the first indication information and the first offset, the method further comprises:
   determining the first offset configured by third configuration information; or
   determining the first offset according to the detection position of the measurement signal and a detection position of discontinuous reception (DRX).

7. The method according to claim 2, wherein the determining the first detection position for the first indication information according to the detection information of the measurement signal comprises:
   determining the first detection position for the first indication information according to the detection information of the measurement signal and detection information of discontinuous reception (DRX).

8. The method according to claim 7, wherein the determining the first detection position for the first indication information according to the detection information of the measurement signal and the detection information of the DRX comprises:

determining the first detection position for the first indication information according to a second reference position and a second offset;

wherein the second reference position is a detection position of a measurement signal closest to a detection position of the DRX, and the second offset is an offset between the first detection position and the second reference position.

9. The method according to claim 1, wherein the determining the first detection position for the first indication information comprises:

in a case that the first configuration information indicates a first resource is used for detecting the first indication information, determining the first resource as the first detection position for the first indication information, the first resource is a control resource set (CORESET) 0 or a search space 0.

10. The method according to claim 1, wherein the entering in a case that the first indication information is not detected, a wake-up state or a sleep state according to fourth configuration information comprises:

entering the wake-up state in a case that the fourth configuration information indicates that the terminal enters the wake-up state when the first indication information is not detected, or entering the sleep state in a case that the fourth configuration information indicates that the terminal enters the sleep state when the first indication information is not detected.

11. The method according to claim 1, further comprising:
detecting second indication information at a second detection position, wherein the second indication information is used to instruct the terminal to enter a wake-up state or a sleep state.

12. The method according to claim 11, further comprising:

determining detected first target indication information according to fifth configuration information, wherein the fifth configuration information indicates: the terminal needs to detect the first target indication information;

detecting second target indication information at a detection position corresponding to the second target indication information when the first target indication information is not detected at a detection position corresponding to the first target indication information; and detecting the second target indication information at a detection position corresponding to the second target indication information when the first target indication information is not detected;

wherein the first target indication information is one of the first indication information and second indication information, and the second target indication information is the other one, except the target indication information, of the first indication information and the second indication information.

13. The method according to claim 11, further comprising:

giving up detecting the second target indication information at the detection position corresponding to the second target indication information in a case that the first target indication information is detected at the detection position corresponding to the first target indication information and the first target indication information indicates the terminal to enter the sleep state;

wherein the first target indication information is one of the first indication information and second indication information, and the second target indication information is the other one, except the target indication information, of the first indication information and the second indication information.

14. The method according to claim 11, wherein at least one of the following parameters of the first indication information and the second indication information is different: radio network temporary identity (RNTI); a format of downlink control information (DCI); a scrambling mode of cyclical redundancy check (CRC); a first field of DCI for distinguishing the first indication information and the second indication information; and a magnitude of load of DCI.

15. A configuration method, applied to a network device and comprising:

transmitting first configuration information, wherein the first configuration information is used for a terminal to determine a first detection position for first indication information, and the first indication information is used to instruct the terminal to enter a wake-up state or a sleep state; and transmitting fourth configuration information, wherein the fourth configuration information indicates that the terminal enters a wake-up state or a sleep state when the first indication information is not detected.

16. The method according to claim 15, further comprising:

transmitting second configuration information, wherein the second configuration information indicates that a detection cycle of the first indication information is equal to N times of the detection cycle for the measurement signal, and N is a positive integer; and/or transmitting third configuration information, wherein the third configuration information is configured with a first offset or a second offset; wherein the first offset is an offset between the detection position for the first indication information and a first reference position, and the second offset is an offset between a first detection position and a second reference position; and/or transmitting fifth configuration information, wherein the fifth configuration information indicates that the terminal detects the first indication information and the second indication information, and the second indication information is used to instruct the terminal to enter a wake-up state or a sleep state.

17. The method according to claim 15, wherein the first configuration information indicates a first resource is used for detecting the first indication information, and the first resource is a control resource set (CORESET) 0 or a search space 0.

18. A terminal, comprising a memory, a processor, and a program stored in the memory and executable on the processor, wherein the program, when executed by the processor, causes the terminal to perform:

determining a first detection position for first indication information, wherein the first detection position is determined based on first configuration information, and the first indication information is used to instruct the terminal to enter a wake-up state or a sleep state;

detecting the first indication information at the first detection position; and entering, in a case that the first indication information is not detected, a wake-up state or a sleep state according to fourth configuration information transmitted by a network device, wherein the fourth configuration information indicates that the terminal enters the wake-up state or the sleep state when the first indication information is not detected.

19. The method according to claim 16, wherein at least one of the following parameters of the first indication information and the second indication information is different: radio network temporary identity (RNTI); a format of downlink control information (DCI); a scrambling mode of cyclical redundancy check (CRC); a first field of DCI for distinguishing the first indication information and the second indication information; and a magnitude of load of DCI.

* * * * *